United States Patent Office.

WILLIAM W. NICHOLLS, OF LOCKPORT, N. Y., ASSIGNOR TO HIMSELF AND DANIEL PRICE, OF SAME PLACE.

IMPROVED PAINT-OIL.

Specification forming part of Letters Patent No. 51,118, dated November 21, 1865.

*To all whom it may concern:*

Be it known that I, WILLIAM W. NICHOLLS, of Lockport, in the county of Niagara and State of New York, have invented a new and useful composition of matter, which I denominate "Compound Petroleum Paint-Oil;" and I do hereby declare that the following is a full and exact description thereof.

It is the object of my invention to produce a substitute for linseed or other vegetable oils used in painting, by a compound of mineral and animal oil or oleaginous substances, which shall possess the necessary consistency and drying qualities to form a vehicle for painting, and be so nearly colorless as to adapt it to pure white and the delicate tints of color.

The following are the ingredients and substantially the proportions which I employ: forty gallons refined petroleum of a gravity of thirty-eight degrees to forty-four degrees, one hundred to one hundred and twenty pounds refined rosin, twenty pounds refined tallow or lard, five gallons raw linseed-oil.

Mix in the following manner:

First, melt the rosin and tallow (or lard) together in an iron or copper vessel with a slow heat, and with particular care that they are not burned.

Second, place the refined petroleum in another similar vessel, and while melting the ingredients in the first vessel bring the oil gradually to a temperature of 80° or 100° Fahrenheit.

Third, have your kettles so arranged that the contents of one may be conveniently and speedily drawn or dipped into the other, and when the rosin and tallow (or lard) is well dissolved or melted add it gradually to the petroleum while both are hot, constantly stirring the ingredients together meanwhile. After being well mixed, remove the fire and let the compound stand until quite cool, then add the linseed-oil and stir again.

Fourth, when prepared in this manner immediately draw it off into barrels or tanks to prevent the compound from becoming discolored by standing in the metallic vessel.

The petroleum, acting as a solvent for both the rosin and animal-fat, permanently unites them, and the compound becomes a limpid and nearly colorless oil, possessing the gravity and body required for painting both for indoor work and exposure to the weather. The ingredients possess the quality of resisting water, and by the gradual evaporation of the volatile portions by drying leaves a strong pellicle to bind the pigment. The viscidity is increased and made to more nearly resemble vegetable oil by the slight addition of linseed-oil in the finishing of the process.

By diminishing the quantity of petroleum in proportion to the other ingredients the density of the compound is increased, and it acquires a body or consistence having the requisites of varnish, which prevents its being so much absorbed by the substance to which it is applied in drying, and in this manner it may be used with pigments in painting the last coat to produce a gloss or the lustrous finish of a coat of varnish.

A variation in the proportion of petroleum will adapt it to work uniformly under the variation of temperature at different seasons of the year.

What I claim as my invention, and desire to secure by Letters Patent, is—

A compound or vehicle for painting composed of the ingredients herein set forth, combined substantially in the manner and proportions described.

WILLIAM W. NICHOLLS.

Witnesses:
J. W. VAIL,
W. COOPER.